Figure 1:
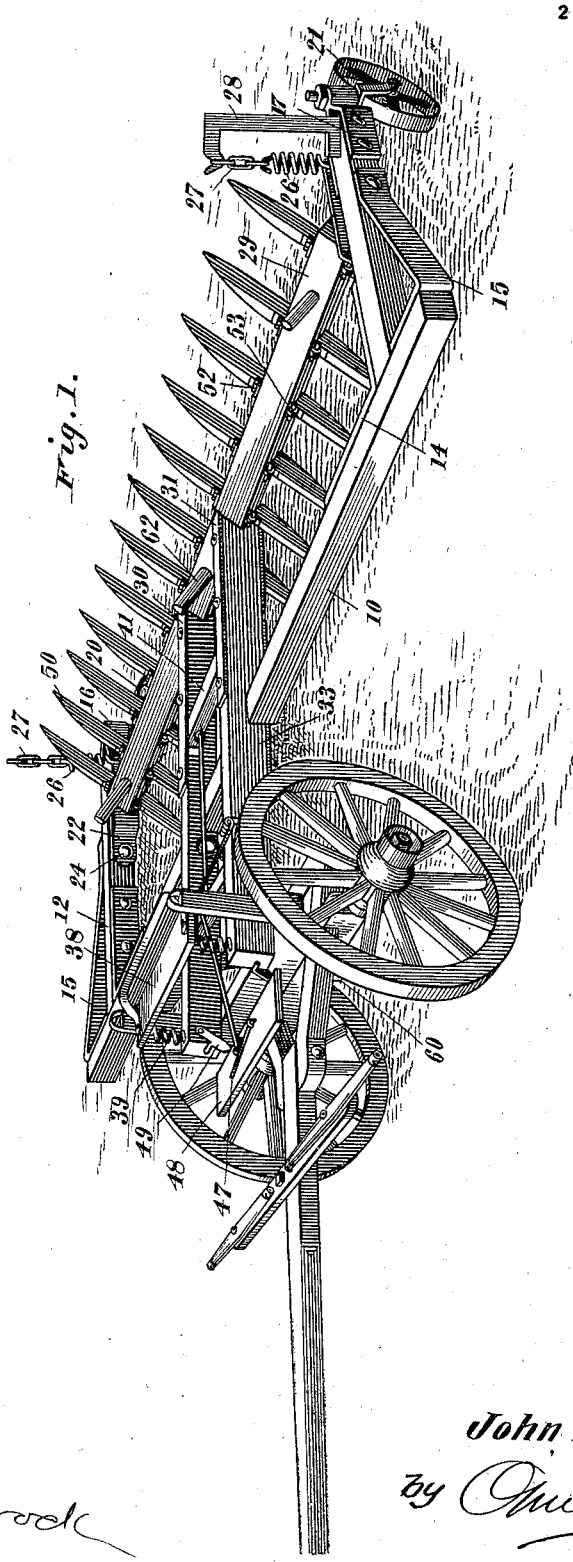

No. 624,960. Patented May 16, 1899.
J. B. MOYER.
CORNSTALK RAKE.
(Application filed June 11, 1898.)

(No Model.) 2 Sheets—Sheet 1.

Witnesses
F. W. Riley
Chas. D. Brock

Inventor
John B. Moyer
By Munn & Co.
Attorneys

THE NORRIS PETERS CO., PHOTO-LITHO., WASHINGTON, D. C.

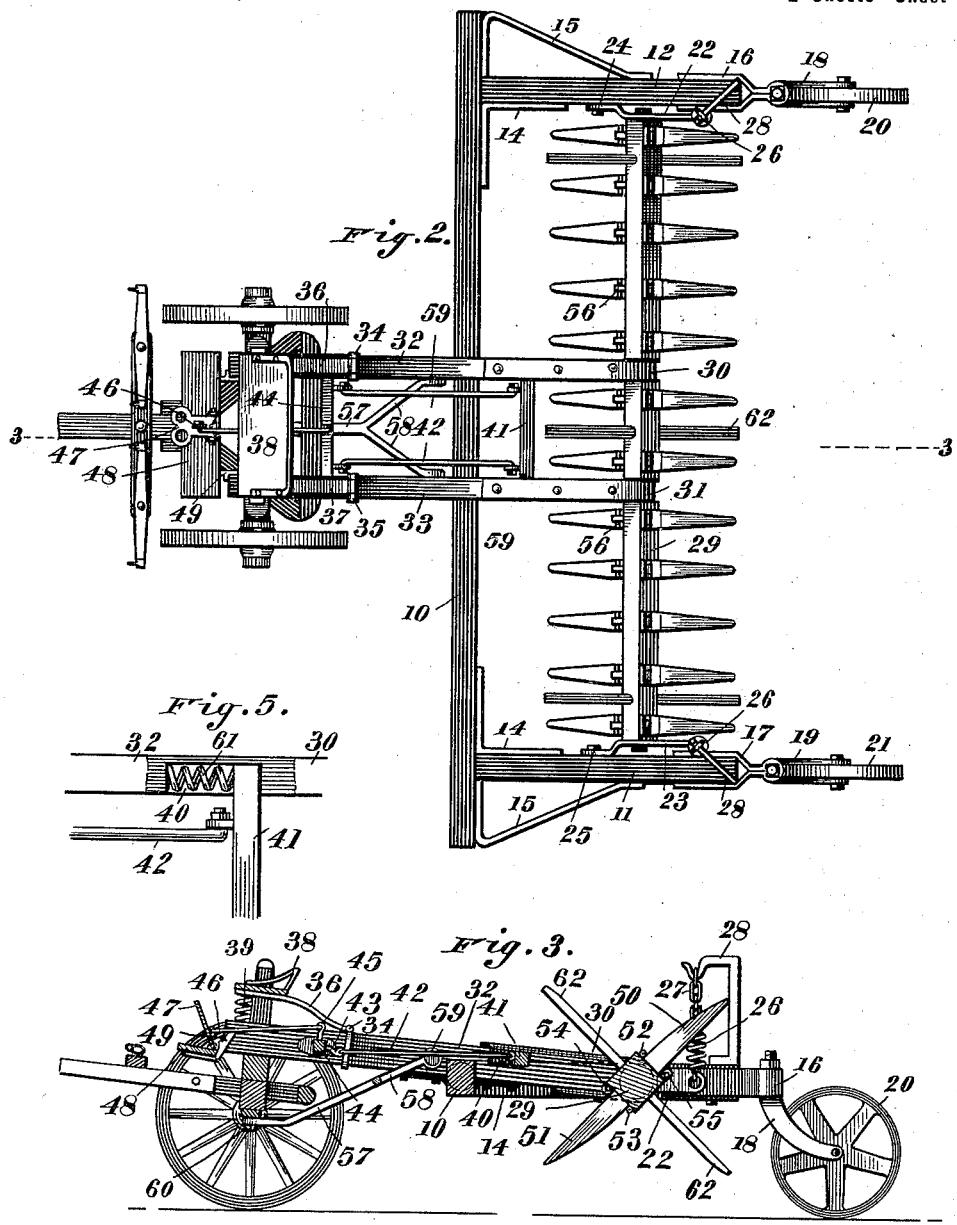

UNITED STATES PATENT OFFICE.

JOHN B. MOYER, OF ORESTES, INDIANA.

CORNSTALK-RAKE.

SPECIFICATION forming part of Letters Patent No. 624,960, dated May 16, 1899.

Application filed June 11, 1898. Serial No. 683,221. (No model.)

*To all whom it may concern:*

Be it known that I, JOHN B. MOYER, a citizen of the United States, residing at Orestes, in the county of Madison and State of Indiana, have invented a new and useful Cornstalk-Rake, of which the following is a specification.

This invention is in the nature of an improved rake of the class which is drawn by horses and commonly known as "horse-rakes," the primary object of the invention being to provide a rake of this class especially adapted for raking cornstalks, heavy hay, or like material.

With this object in view my invention consists in the improved construction, arrangement, and combination of parts hereinafter fully described, by means of which the rake may be readily elevated to any suitable height above the ground and may be held against rotating at will, the particular points of novelty embraced in the construction being specifically set forth in the claims appended hereto.

In order to enable others skilled in the art to which my invention most nearly appertains to make and use the same, I will now proceed to describe its construction and operation, having reference to the accompanying drawings, forming part hereof, in which—

Figure 1 is a perspective view of a rake constructed in accordance with my invention connected to the front wheels, axle, and tongue of an ordinary wagon. Fig. 2 is a top plan view thereof. Fig. 3 is a vertical section on the line 3 3 of Fig. 2. Fig. 4 is a detail view, in side elevation, of a portion of the rake-support and elevating mechanism on a enlarged scale. Fig. 5 is a detail top plan view, on an enlarged scale, of parts to be hereinafter referred to.

Like numerals of reference indicate the same parts in all the figures of the drawings.

Referring to the drawings by numerals, 10 indicates the main cross-bar of the rake-frame, from which projects rearwardly at right angles thereto the side bars 11 and 12, which are secured to the rake-frame and strengthened by angle-bars 14 and braces 15. At the rear end of the side frames are secured clevises 16 and 17, in the rear ends of which are mounted casters 18 and 19, carrying wheels 20 and 21, the upright bars of the casters being swiveled in the ends of the clevises.

22 and 23 indicate metal bars pivoted at 24 and 25 to the inner sides of the side beams 12 and 11 of the frame and projecting rearwardly, being yieldingly held by means of springs 26, connected to their rear ends, and chains 27, connected to the upper ends of the springs and to hangers 28, mounted upon the top of the side beams.

29 indicates the rake-beam, which is rectangular in section and pivotally secured in the swinging bars 22 and 23. Stirrups 30 and 31, secured upon the rear ends of longitudinal beams 32 and 33, pivotally embrace rounded portions of the rake-beam near its center, the longitudinal beams being secured to and projecting some distance in advance of the main cross-beam 10 of the rake-frame. Clips 34 and 35 embrace the beams 32 and 33, arms 36 and 37 being pivoted in said clips and extending forwardly over the beams 32 and 33. A seat 38 is mounted upon the top of these arms 36 and 37, and the arms are yieldingly supported by springs 39, mounted between their outer ends and the top of the beams 32 and 33. Stirrups 30 and 31, before mentioned, embrace the beams 32 and 33 for some distance, and the beams are provided with rectangular recesses 40 on their inner sides, as most clearly shown in Fig. 5. The ends of a cross-bar 41 are seated in these recesses, and rods 42 connect this cross-bar near each end with arms 43, projecting from a rock-shaft 44, pivoted between the beams 32 and 33 toward the front. Another arm 45 projects from the center of the rock-shaft 44 at about an angle of sixty degrees from the arms 43 and is connected by means of a rod 46 to a treadle 47, pivotally mounted upon a foot-board 48, which is supported on side arms 49, pivoted at the front ends of the beams 32 and 33. Teeth 50 and 51 are pivotally connected at 52 and 53 with the rake-beam on opposite sides and are provided with hasps 54 and 55, registering with eyes 56, projecting from the rake-beam when the teeth are in operative position, the teeth being held in such position by moderately-strong but breakable pins, whereby the teeth will be held rigid for all ordinary work, the pins breaking when extraordinary strain is brought upon the teeth, permitting them to move backward on their pivotal or hinged connections and pass over the obstruction without breaking.

57 indicates a bar bifurcated at its rear end forming arms 58, which are hinged at 59 to the inner sides of the beams 32 and 33.

The rake is adapted to be drawn behind the ordinary front axle of a wagon, upon which the beams 32 and 33 rest at their forward ends, the king-bolt 60 of the wagon passing through an opening in the forward end of the bar 57. A spring 61 (see Fig. 5) is placed in each of the recesses in the beams 32 and 33 in front of the ends of the cross-bar 41, said springs normally holding the cross-bar in its rearward portion, in which position it will intercept the ends of a rod 62, passed through the rake-beam 29 and projecting therefrom at right angles to the teeth when in position for operation, thereby preventing the rotation of the rake-beam.

The construction of my improved rake will be readily understood by the foregoing description, and its operation may be described as follows:

The driver being mounted upon the seat 38 his feet will rest upon the foot-board 48 on each side of the treadle 47. The front end of the rake-frame will be supported upon the front axle and the rear end upon the caster-wheels 20 and 21. The rake-beam and its teeth will be yieldingly supported by means of the springs 26, the length of the spring-support being adjustable by engaging different links of the chains 27 over the hook ends of the hangers 28. The team being now started, the teeth will assume their operative positions, which will be slightly inclined forward from a vertical line below the beam, and the rake may be drawn along, gathering the cornstalks, heavy hay, or other material in front of the teeth until a sufficient quantity has been piled up, when the driver, by pressing one or both of his feet upon the treadle 47, will draw the cross-bar 41 forward against the action of the springs in the recess 40 until the cross-bar is drawn out of engagement with the bar 62. This will free the bar 62 and permit it, the teeth, and rake-beam to rotate and ride over the pile of material gathered in front of the teeth, the teeth 50 and 51 (see Fig. 3) exchanging positions, the teeth 50 becoming the lower or active series. The driver will at once release the treadle 47 after the bar 62 has slipped past it, when the springs in the recess 40 will press the cross-bar 41 rearwardly again in position to catch the opposite end of the bar 62 as it comes around, thus stopping the rotation of the beam 29 with the teeth 50 in position for work. This operation will be repeated as often as a sufficient amount of material is raked up.

During the operation of the rake the caster-wheels 20 and 21 being mounted upon a vertically-pivoted frame will permit the turning of the rake in any direction as freely as though the rake dragged upon the ground. In addition these wheels give a rolling support rather than a drag to the rake, thus rendering the work of the team much easier.

While I have illustrated and described the best means now known to me for carrying out my invention, I do not wish to be understood as restricting myself to the exact details of construction shown, but hold that any slight variation therefrom, such as might suggest itself to the ordinary mechanic, would be clearly comprehended within the limit and scope of my invention.

Having thus fully described my invention, what I claim as new, and wish to secure by Letters Patent of the United States, is—

1. The combination with the side beams of the rake-frame, of hangers mounted thereon, bars pivoted to the inner sides of the beams, the rake-beam pivoted in said bars, and adjustable spring-supporting connection between the free ends of said bars and the hangers, substantially as described.

2. The combination with the main frame of the rake comprising the main cross-beam, and rigid side beams projecting rearwardly therefrom, of spring-supported bearings, the rake-beam journaled therein, supporting-wheels at the rear ends of the side beams, central longitudinal beams adapted to rest upon the front axle of a wagon, stirrups embracing the rear ends of said beams and rounded portions of the rake-beam, and a forked lever pivotally secured between the longitudinal beams and constructed at its forward end to receive the king-bolt of the wagon, substantially as described.

3. The combination of the rake-frame comprising parallel longitudinal bars, the rake-beam pivotally secured to the rear end of said bars, teeth projecting from opposite sides of the rake-beam, a bar passed through and projecting laterally from the rake-beam at right angles to the teeth, a cross-bar having its ends seated in recesses formed in the inner sides of the longitudinal bars, springs in said recesses to normally hold the cross-bar in its rear position in the path of movement of the bar projecting from the rear beam, a treadle within reach of the driver, a rock-shaft pivoted between the longitudinal bars, arms projecting from said rock-shaft, rods connecting said arms with the cross-bar, a single arm projecting from the rock-shaft, at an angle to the other arms, and a single rod connecting the single arm with the treadle, substantially as described.

4. The combination with the rake-beam provided with flat opposite surfaces and eyes projecting from said surfaces, teeth hinged to the beam and having square inner ends to rest against the flat opposite surfaces, when the teeth are in operative position, hasps projecting from the inner ends of the teeth on the opposite sides from the hinges or pivotal connections and registering with the eyes of the beam when the teeth are in operative position, and breakable pins passed through the hasps and eyes to retain the teeth in operative position against ordinary strain, but breaking and relieving the teeth under extraordinary strain, substantially as described.

JOHN B. MOYER.

Witnesses:
OSCAR L. ATHAN,
W. K. CARVER.